United States Patent
Lee et al.

(10) Patent No.: US 8,586,002 B2
(45) Date of Patent: Nov. 19, 2013

(54) LITHIUM TITANIUM OXIDE FOR ANODE ACTIVE MATERIAL FOR LITHIUM RECHARGEABLE BATTERY, METHOD OF PREPARING LITHIUM TITANIUM OXIDE, AND LITHIUM RECHARGEABLE BATTERY INCLUDING LITHIUM TITANIUM OXIDE

(75) Inventors: Jong-Ho Lee, Yongin-si (KR); Young-Su Kim, Yongin-si (KN); Jae-Myung Kim, Yongin-si (KR); Kyu-Nam Joo, Yongin-si (KR); So-Ra Lee, Yongin-si (KR); Deok-Hyun Kim, Yongin-si (KR); Gu-Hyun Chung, Yongin-si (KR); Beom-Kwon Kim, Yongin-si (KR); Yong-Mi Yu, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 252 days.

(21) Appl. No.: 12/900,280

(22) Filed: Oct. 7, 2010

(65) Prior Publication Data

US 2011/0085965 A1    Apr. 14, 2011

(30) Foreign Application Priority Data

Oct. 8, 2009   (KR) .................. 10-2009-0095664

(51) Int. Cl.
*C01G 23/00*    (2006.01)

(52) U.S. Cl.
USPC .................. 423/598; 429/231.95; 429/231.5; 429/209

(58) Field of Classification Search
USPC .............. 252/182.1; 429/231.95, 231.5, 209; 423/598

See application file for complete search history.

(56) References Cited

U.S. PATENT DOCUMENTS

| | | | | |
|---|---|---|---|---|
| 2001/0031401 | A1* | 10/2001 | Yamawaki et al. | 429/231.1 |
| 2004/0265587 | A1* | 12/2004 | Koyanagi et al. | 428/398 |
| 2011/0073804 | A1 | 3/2011 | Sotokawa et al. | |

FOREIGN PATENT DOCUMENTS

| | | |
|---|---|---|
| JP | 2000302547 | 10/2000 |
| JP | 2001-192208 | 7/2001 |
| KR | 10-2004-0032951 | 4/2004 |
| KR | 10-2008-0101993 | 11/2008 |
| WO | 2009028530 | 3/2009 |

OTHER PUBLICATIONS

Abe et al., Preparation of phase pure and well-crystallized Li4Ti5O12 nanoparticles by precision control of starting mixture and calcining at lower possible temperatures, 2007, Journal of Physics and Chemistry of solids, 68, 681-686.*

(Continued)

*Primary Examiner* — Kaj K Olsen
*Assistant Examiner* — Pritesh Darji
(74) *Attorney, Agent, or Firm* — Robert E. Bushnell, Esq.

(57) ABSTRACT

A lithium titanium oxide for an anode active material of a lithium rechargeable battery, wherein a X-ray diffraction (XRD) spectrum has a first peak of $Li_4Ti_5O_{12}$ and a second peak, and $A_{50-55}/A_{78-80}$ is in a predetermined range, as a result of XRD analysis, where $A_{78-80}$ is an Area of the first peak and $A_{50-55}$ is an Area of the second peak in XRD.

4 Claims, 3 Drawing Sheets

(56) References Cited

OTHER PUBLICATIONS

Shen et al., Preparation and characterization of nanocrystalline Li4Ti5O12 by sol-gel method, 2002, Materials Chemistry and Physics, 78, 437-441.*

Korean Office Action issued by KIPO on Oct. 4, 2011 in connection with Korean Patent Application No. 10-2009-0095664 and Request for Entry of the Accompanying Office Action attached herewith.
Martin Kalbac, Marketa Zukalova, Ladislav Kavan, Journal of Solid State Electrochemistry vol. 8, No. 1, pp. 2-6.

* cited by examiner

LITHIUM TITANIUM OXIDE FOR ANODE ACTIVE MATERIAL FOR LITHIUM RECHARGEABLE BATTERY, METHOD OF PREPARING LITHIUM TITANIUM OXIDE, AND LITHIUM RECHARGEABLE BATTERY INCLUDING LITHIUM TITANIUM OXIDE

CLAIM OF PRIORITY

This application claims the benefit of Korean Patent Application No. 10-2009-0095664, filed on Oct. 8, 2009, in the Korean Intellectual Property Office, the disclosure of which is incorporated herein in its entirety by reference.

BACKGROUND OF THE INVENTION

1. Field of the Invention

One or more embodiments of the present invention relate to a lithium titanium oxide for an anode active material for a lithium rechargeable battery, a method of preparing the lithium titanium oxide for the lithium rechargeable battery, and a lithium rechargeable battery including the lithium titanium oxide for the lithium rechargeable battery.

2. Description of the Related Art

A lithium ion rechargeable battery is a kind of a rechargeable battery that generates electricity by motion of lithium ions between a cathode and an anode. The lithium ion rechargeable battery generally includes a cathode, an anode, an electrolyte, and a separator. Cathode and anode active materials as components of the lithium ion rechargeable battery constitute a structure in which lithium ions move by reversible reactions from the anode active material to the cathode active material during discharging and vice versa during charging.

A lithium metal has been used as an anode active material. However, when a lithium metal is used in a battery, short circuits may occur in the battery due to the formation of dendrite, and thus the battery may explode. Thus, a carbon-based material instead of a lithium metal has been widely used as an anode active material.

Examples of the carbon-based active material may include crystalline carbon such as graphite and artificial graphite, and amorphous carbon such as soft carbon and hard carbon. However, although the amorphous carbon has a large capacity, the amorphous carbon has high irreversibility during charging and discharging. Graphite is representatively used as crystalline carbon. In addition, graphite has a high theoretical restrictive capacity of 372 mA h/g, and thus graphite is used as an anode active material. However, although graphite or a carbon-based active material have a relatively high theoretical capacity, the theoretical capacity is no more than about 380 mAh/g, and thus they may not be used to develop a high-capacity lithium battery.

SUMMARY OF THE INVENTION

One or more embodiments of the present invention include a lithium titanium oxide for an anode active material for a lithium rechargeable battery, the lithium titanium oxide having a small amount of impurities.

One or more embodiments of the present invention include a method of preparing the anode active material for the lithium rechargeable battery.

One or more embodiments of the present invention include a lithium rechargeable battery including the anode active material.

Additional aspects will be set forth in part in the description which follows and, in part, will be apparent from the description, or may be learned by practice of the presented embodiments.

According to one or more embodiments of the present invention, a lithium titanium oxide for an anode active material for a lithium rechargeable battery, wherein an X-ray diffraction (XRD) spectrum has a first peak of lithium titanate ($Li_4Ti_5O_{12}$) and a second peak, wherein the first peak is in the range of about 78 to about 80 degrees, and the second peak is in the range of about 50 to about 55 degrees, and wherein. $A_{50-55}/A_{78-80}$ is in the range of about 0.5 to about 2.0, where $A_{78-80}$ is an Area of the first peak and $A_{50-55}$ is an Area of the second peak.

The second peak may be a peak of $TiO_2$.

The lithium titanium oxide may have a spinel structure.

The lithium titanium oxide may have a diameter in the range of about 200 to about 450 nm.

According to one or more embodiments of the present invention, a lithium rechargeable battery includes the lithium titanium oxide.

According to one or more embodiments of the present invention, a method of preparing a lithium titanium oxide for an anode active material for a lithium rechargeable battery, the method including mixing a lithium salt and brookite-phase titania to prepare a mixture; and heating the mixture.

The lithium salt may be at least one selected from the group consisting of lithium nitrate, lithium hydroxide, lithium chloride, lithium oxide and lithium carbonate.

Li:Ti may be 4:5 in the mixing.

The heating may be performed at a temperature in the range of about 300 to about is 700° C.

The heating may be performed at a temperature in the range of about 400 to about 600° C.

The heating may be performed for about 0.5 to about 4 hours.

The method may further include pulverizing the mixture after the heating.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION OF THE INVENTION

Figure 1:
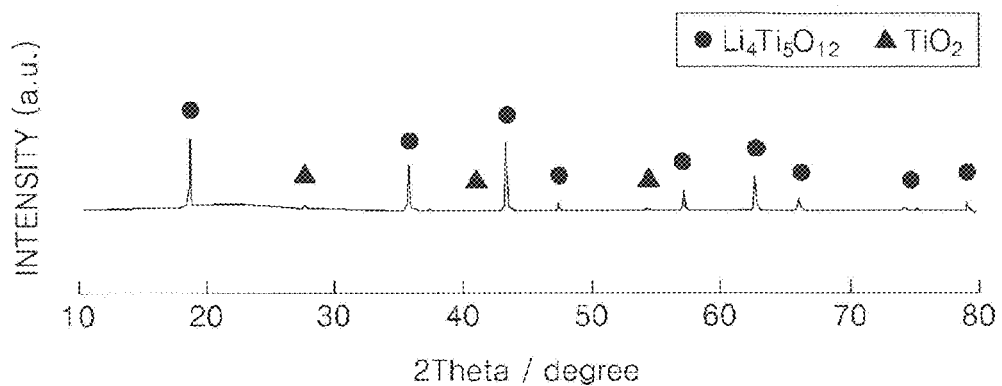
FIG. 1 is a graph showing X-ray diffraction (XRD) of a lithium titanium oxide according to an embodiment of the present invention.

Reference will now be made in detail to embodiments.

In order to develop a lithium ion rechargeable battery with rapid charging/discharging and long lifetime characteristics, active research has been recently conducted on a technology of using lithium titanate ($Li_4Ti_5O_{12}$), which is a metal oxide having a spinel structure, as an anode active material.

$Li_4Ti_5O_{12}$ does not generate a solid state interphase (SEI) that is generated in an accompanying reaction between a graphite-based anode active material and an electrolyte.

Thus, $Li_4Ti_5O_{12}$ has is much better than graphite in terms of the irreversible capacity, and has excellent reversibility for lithium ions to be inserted into and released from $Li_4Ti_5O_{12}$ in a repetitive charging/discharging cycle. In addition, the structure of $Li_4Ti_5O_{12}$ is very stable, and thus $Li_4Ti_5O_{12}$ may lead to improved performances of a rechargeable battery, such as long lifetime.

As a method of preparing $Li_4Ti_5O_{12}$ having a spinet structure, a solid phase method and a liquid phase method have been mainly used. In the solid phase method, diffusion of solid particles is used, and a compound having a desired composition is prepared by a milling operation and a heating operation at a high temperature. According to the solid phase method, $Li_4Ti_5O_{12}$ may be simply prepared and may be produced in large quantities. In addition, the solid phase method is commercially available.

However, the amount of titania remaining in a general lithium titanium oxide for an anode active material for a lithium rechargeable battery has adverse effects on battery performance.

This problem is related to a method of preparing a lithium titanium oxide. According to one or more embodiments of the present invention, by preparing a lithium titanium oxide at a relatively low temperature, the amount of titania remaining in a lithium titanium oxide for an anode active material for a lithium rechargeable battery is remarkably reduced, and thus, battery performance is remarkably increased compared to a general case.

The amount of titania remaining in a lithium titanium oxide may be measured by comparing a $Li_4Ti_5O_{12}$ peak and a $TiO_2$ peak in a X-ray diffraction (XRD) spectrum.

One or more embodiments of the present invention include a lithium titanium oxide for an anode active material for a lithium rechargeable battery of which an X-ray diffraction (XRD) spectrum has a first peak of lithium titanate ($Li_4Ti_5O_{12}$) and a second peak, wherein the first peak is in the range of about 78 to about 80 degrees, and the second peak is in the range of about 50 to about 55, and wherein $A_{50\text{-}55}/A_{78\text{-}80}$ is in the range of about 0.5 to about 2.0, where $A_{78\text{-}80}$ is an Area of the first peak and $A_{50\text{-}55}$ is an Area of the second peak, a method of preparing the lithium titanium oxide for the anode active material of the lithium rechargeable battery, and a lithium rechargeable battery including the lithium titanium oxide for the anode active material of the lithium rechargeable battery. (analysis condition: 5 to 80 degrees, 0.02 degree/step, and X-ray: 40 kV/20 mA)

According to XRD analysis of a lithium titanium oxide, an XRD spectrum exhibits various $Li_4Ti_5O_{12}$ peaks and $TiO_2$ peaks.

This peak property is a peculiar property of a lithium titanium oxide. However, the presence of the $TiO_2$ peak means that undesirable $TiO_2$ exists. The second peak may be the $TiO_2$ peak.

According to an embodiment of the present invention, a lithium titanium oxide may have the first peak in the range of about 78 to about 80 degrees, and the second peak in the range of about 50 to about 55, wherein $A_{50\text{-}55}/A_{78\text{-}80}$ may be in the range of about 0.5 to about 2.0. In this case, an Area of each peak is calculated by measuring corresponding area.

According to an embodiment of the present invention, a lithium titanium oxide may have, for example, a spinet structure.

According to an embodiment of the present invention, a lithium titanium oxide may be a granule, and may have a diameter in the range of about 200 to about 450 nm.

Next, a method of preparing a lithium titanium oxide will be described.

In a general technology for preparing $Li_4Ti_5O_{12}$ by using a general solid phase method, a rutile phase that is stable at a high temperature is used as a crystalline phase of titania that is used as a precursor. However, according to the general technology, it is difficult to control a composition ratio of lithium to titanium, and thus titania that does not participate in a reaction and also $Li_4Ti_5O_{12}$ having a spinel structure remains as impurities, and $Li_4Ti_5O_{12}$ is prepared at a high temperature as a crystallization temperature.

According to an embodiment of the present invention, a method of preparing a lithium titanium oxide includes pulverizing and mixing brookite-phase titania powders and lithium salt powders in a ball milling operation, heating the mixture of the prepared lithium salt and titania up to a decomposition temperature of the lithium salt in a sintering furnace so as to make lithium ions in titania to a solid solution and to crystallize the lithium titanium oxide having a spinel structure, and pulverizing $Li_4Ti_5O_{12}$ powders that are finally prepared into fine particles.

According to an embodiment of the present invention, titania having a brookite crystalline phase may be used as a precursor. Titania is classified into three types: brookite-phase titania of an orthorhombic system, anatase-phase titania, and rutile-phase titania of a tetragonal system according to the crystalline structure. The three types of titania have different crystalline structures and physicochemical properties according to a bonding method of titanium ions and oxygen atoms. In the anatase-phase titania and rutile-phase titania, titanium ions are combined with oxygen atoms having a symmetrical structure, and thus the anatase-phase titania and rutile-phase titania exhibit a stable structure and are also stable at a high temperature. However, in the brookite-phase titania, titanium ions are combined with oxygen atoms having an asymmetrical structure, and thus the brookite-phase titania has an unstable structure and is stable only at a low temperature.

Brookite-phase titania ($TiO_6$) has a structure having a tunnel that is longer in a 'c' axis based on a crystalline axis by bonding a titanium ion as the center of an octahedron to 6 oxygen atoms having an asymmetrical structure, and bonding each octahedron to edges of three adjacent octahedrons so as to be grown in direction [100]. Due to these structural properties of the brookite-phase titania ($TiO_6$), the brookite-phase titania ($TiO_6$) provides better capture conditions, that is, make a lithium ion to a solid solution having a small atomic radius compared to anatase-phase titania or rutile-phase titania. As describe above, titania that does not participate in a reaction remains as impurities, which is a nonproductive problem of the general solid phase method. According to the method of preparing the lithium titanium oxide according to the present embodiment, this problem is resolved and titania may be crystallized at a low temperature.

According to an embodiment of the present invention, a method of preparing a lithium to titanium oxide includes mixing a lithium salt and brookite-phase titania ($TiO_6$); and heating the mixture.

Any salt including lithium, such as lithium nitrate, lithium hydroxide, lithium oxide, lithium carbonate and lithium chloride may be used as the lithium salt. However, in order to increase the effect of the lithium salt, a lithium salt having a low melting point, for example, lithium nitrate and lithium hydroxide, may be used.

In the mixing of the lithium salt and the titania, Li:Ti may be 4:5, a ball milling operation is performed on the lithium salt and the titania, and then the lithium salt and the titania are regularly mixed by pulverizing and powdering the lithium salt and the titania.

During the heating where lithium ions are captured and $Li_4Ti_5O_{12}$ is crystallized, the lithium ions are made to a solid solution at a temperature equal to or greater than a melting point of the lithium salt, and $Li_4Ti_5O_{12}$ having a spinel structure is crystallized.

When the brookite-phase titania ($TiO_6$) is used, $Li_4Ti_5O_{12}$ may be prepared although heating is performed when capturing and crystallizing operations are not separately performed, unlike in the general solid phase method.

Heating conditions may be determined according to a lithium salt. When lithium nitrate and lithium hydroxide are used, the heating may be performed at a temperature in the range of about 300 to about 70° C., for example, in the range of about 400 to about 600° C. C.

The heating may be performed for about 0.5 to about 4 hours.

In a last operation, the preparation of $Li_4Ti_5O_{12}$ powders is completed by pulverizing $Li_4Ti_5O_{12}$ powders so as to be fine particles.

A lithium titanium oxide prepared by the above-described method may be used, and thus a lithium battery according to an embodiment of the present invention may be prepared as follows.

First, a cathode active material, a conductive agent, a binder, and a solvent are mixed so as to prepare a cathode active material composition. A cathode plate may be prepared using the cathode material composition, by coating the cathode material composition directly on an aluminum current-collector or casting the cathode material composition on a separate support, delaminating the cathode material composition from the support so as to obtain a cathode active material film, and laminating the cathode active material film on the aluminum current-collector.

Any lithium containing metal oxide that is generally used in the art may be used as the cathode active material. Examples of the cathode active material may include $LiCoO_2$, $LiMn_xO_{2x}$, $LiNi_x-1Mn_xO_{2x}$ (x=1, 2), and $LiNi_{1-x-y}Co_xMn_yO_2$ ($0 \leq x \leq 0.5$, $0 \leq y \leq 0.5$).

The conductive agent may be carbon black. The binder may be one selected from the group consisting of a vinylidene fluoride/hexafluoropropylene copolymer, poly vinylidene fluoride, polyacrylonitrile, polymethylmethacrylate, polytetrafluoroethylene and any combinations thereof, and a styrene butadiene rubber polymer, and the solvent may be at least one selected from the group consisting of N-methylpyrrolidone (NMP), acetone, and water. In this case, the cathode active material, the conductive agent, the binding agent, and the solvent may be used in different amounts to make a general lithium battery.

Similar to a method of preparing the above-described cathode plate, an anode plate may be prepared by preparing an anode active material composition by mixing an anode active material, a conducive agent, a binder and a solvent, coating the anode active material composition directly on a copper current-collector or casting the anode active material composition on a separate support, delaminating the anode material composition from the support so as to obtain an anode active material film, then laminating the cathode active material film on the copper current-collector. In this case, the anode active material, the conductive agent, the binding agent, and the solvent may have amounts of a general lithium battery.

The above-described lithium titanium oxide is used as the anode active material. The conductive agent, the binder, and solvent in the anode active material composition are the same in the cathode active material composition. If necessary, pores may be formed in the cathode and anode plates by further adding a plasticizer to the cathode active material composition and the anode active material composition.

Any separator that is generally used in a lithium battery may be used. The separator may have a low resistance with respect to ion-movement of electrolyte and a good capability of impregnating an electrolytic solution. For example, the separator may be one selected from the group consisting of a glass fiber, polyester, Teflon, polyethylene, polypropylene, polytetrafluoroethylene (PTFE) and combinations thereof, and may have the form of a non-woven fabric or a woven fabric. In particular, a windable separator such as a polyethylene and polypropylene may be used in a lithium ion battery. In addition, a separator having a good capability of impregnating an organic electrolytic solution may be used in lithium ion polymer battery. This separator may be prepared using the following method.

That is, the separator may be prepared by mixing a polymer resin, a filler, and a solvent to prepare a separator composition, and then coating and drying the separator composition directly on an electrode to form a separator film, or casting and drying the separator composition on a support, delaminating a separator film from the support, and then laminating the separator film on the electrode.

The copolymer resin is not limited to any particular material, and may be any material that is used as a binding agent for an electrode plate. For example, the copolymer resin may be one selected from the group consisting of a vinylidene fluoride/hexafluoropropylene copolymer, poly vinylidene fluoride, polyacrylonitrile, polymethylmethacrylate or any combinations thereof. In particular, a vinylidene fluoride/hexafluoropropylene copolymer of which hexafluoropropylene has an amount in the range of about 8 to about 25 wt % may be used.

Then, the separator is disposed between the cathode plate and the anode plate so as to form a battery structure. The preparation of a lithium ion battery is completed by winding or folding the battery structure and accommodate it into a cylindrical battery case or a square battery case, and then injecting the organic electrolyte into the cylindrical battery case or the square battery case. The preparation of a lithium ion polymer battery is completed by stacking battery structures in a by-cell structure, impregnating the battery structures in an organic electrolyte, accommodating the resultant in a pouch, and then sealing the vresultant structure.

The organic electrolyte may include a mixed organic solvent including a lithium salt, a high dielectric constant solvent, and a low boiling point solvent, and may further include various additives such as an anti-overcharging agent, if necessary.

Any material that is generally used in the art may be used as the high dielectric constant solvent used in the organic electrolyte. The high dielectric constant solvent may be a ring-type carbonate such as ethylene carbonate, propylene carbonate, and butylene carbonate, or γ-butyrolactone.

Any material that is generally used in the art may be used as the low boiling point solvent. The low boiling point solvent may be chain-type carbonate such as dimethyl carbonate, ethyl methyl carbonate, diethyl carbonate and dipropyl carbonate, dimethoxy ethane, diethoxy ethane, or ester of fatty acids, but is not particularly limited.

At least one hydrogen atom included in the high dielectric constant solvent or the low boiling point solvent may be substituted by a halogen atom. Fluorine may be used as the halogen atom.

A mixing volume ratio between the high dielectric constant solvent and the low boiling point solvent may be in the range of about 1:1 to about 1:9. When the mixing volume ratio is outside this range, desired charging capacity and charging/discharging lifetime may not be obtained.

In addition, any lithium salt that is generally used in a general lithium battery may be used as the lithium salt used in the organic electrolyte. The lithium salt may be at least one selected from the group consisting of $LiClO_4$, $LiCF_3SO_2$, $LiPF_6$, $LiN(CF_3SO_2)_2$, $LiC(CF_3SO_2)_3$, and $LiN(C_2F_5SO_2)_2$.

The concentration of the lithium salt with respect to the organic electrolyte may be in the range of about 0.5 to about 2 M. When the concentration of the lithium salt is less than 0.5 M, the conductivity of the electrolyte decreases, and thus the performance of the electrolyte decreases. When the concentration of the lithium salt is more than 2.0 M, the viscosity of the electrolyte increases, and thus the mobility of lithium ions decreases.

Hereinafter, one or more embodiments of the present invention will be described in detail with reference to the following examples. However, these examples are not intended to limit the purpose and scope of the one or more embodiments of the present invention.

EXAMPLE 1

Mixed fine powders were prepared by measuring 18.3 wt % of lithium hydroxide and 43.5 wt % of brookite-phase titania ($TiO_6$), putting the mixture in a container formed of zirconia and filled with zirconia balls, performing a milling operation at a rotation speed of 450 rpm for 6 hours, and then pulverizing and mixing raw materials.

A final resultant was obtained by heating the mixed fine powders under an oxygen atmosphere and a temperature condition in that a temperature increases by 5° C. every minute, at a temperature of 450° C. for one hour, and at a temperature of 550° C. for three hours, and then pulverizing the sintered material in a pulverizer.

According to analysis of X-ray crystalline structure, $Li_4Ti_5O_{12}$ having a spinel structure was successfully synthesized, which is shown in FIG. 1.

EXAMPLE 2

Mixed fine powders were prepared by measuring 18.3 wt % of lithium hydroxide and 43.5 wt % of brookite-phase titania ($TiO_6$), putting the mixture in a container formed of zirconia and filled with zirconia balls, performing a milling operation at a rotation speed of 450 rpm for 6 hours, and then pulverizing and mixing raw materials.

A final resultant was obtained by heating the mixed fine powders under an oxygen atmosphere and a temperature condition in that a temperature increases by 5° C. every minute, at a temperature of 450° C. for 1.5 hours, and at a temperature of 550° C. for three hours, and then pulverizing the sintered material in a pulverizer.

Figure 2:
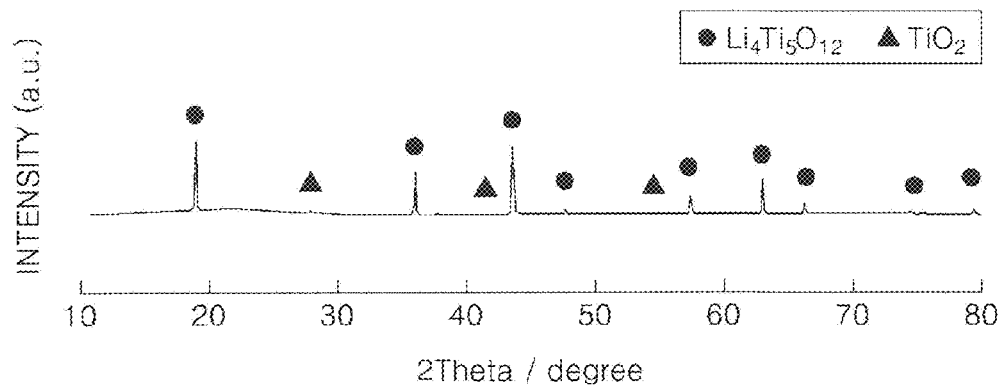
FIG. 2 is a graph showing XRD of a lithium titanium oxide according to another embodiment of the present invention.
Figure 4:
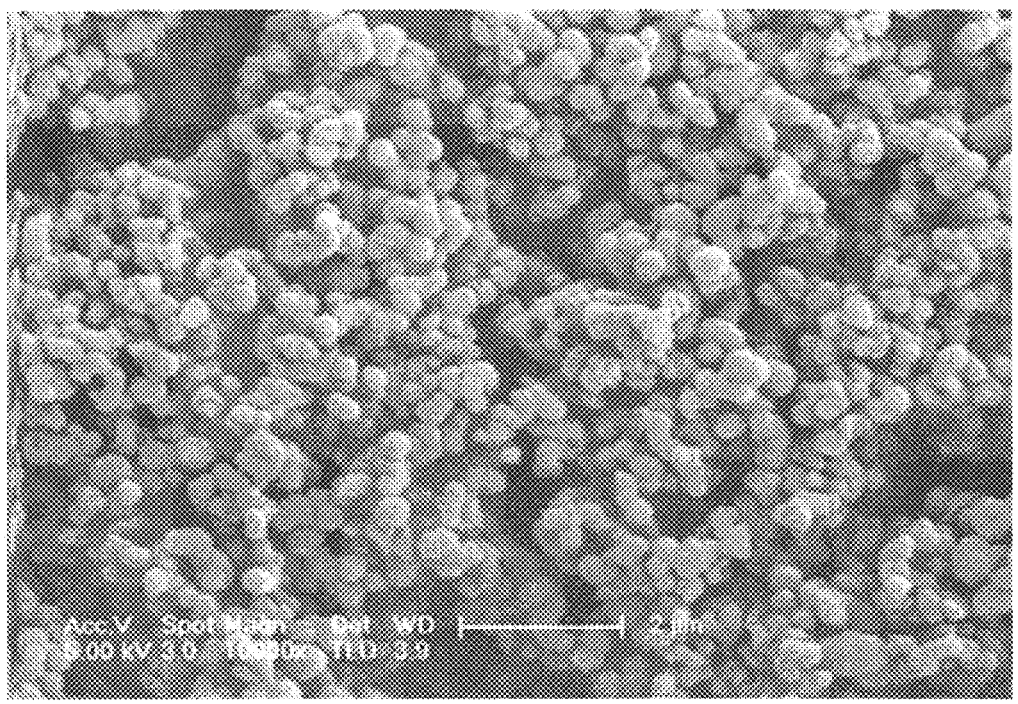
FIG. 4 is a scanning electron microscope (SEM) image of a lithium titanium oxide according to an embodiment of the present invention.

According to analysis using a scanning electron microscope (SEM), prepared $Li_4Ti_5O_{12}$ has an average size of 270 nm, as shown in FIG. 4. According to analysis of X-ray crystalline structure, $Li_4Ti_5O_{12}$ having a spinel structure was successfully synthesized, which is shown in FIG. 2.

COMPARATIVE EXAMPLE 1

Mixed fine powders were prepared by measuring 18.3 wt % of lithium hydroxide and 43.5 wt % of rutile-phase titania (Li:Ti=4:5), putting the mixture in a container formed of zirconia and filled with zirconia balls, performing a milling operation at a rotation speed of 450 rpm for 6 hours, and then pulverizing and mixing raw materials.

A final resultant was obtained by heating the mixed fine powders in an oxygen atmosphere and a temperature environment where a temperature increased by 5° C. every minute, at a temperature of 450° C. for 1.5 hours, and at a temperature of 750° C. for three hours, and then pulverizing the sintered material in a pulverizer.

Figure 3:
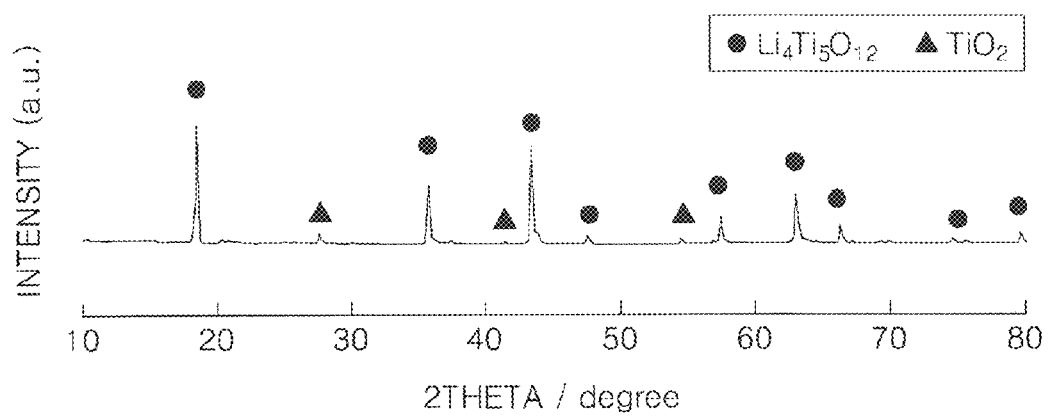
FIG. 3 is a graph showing XRD of a general lithium titanium oxide.

According to analysis of X-ray crystalline structure, both $Li_4Ti_5O_{12}$ and tiania exist, which is shown in FIG. 3.

Comparison and Analysis of XRD Graph

When an Area of a main peak (79 degrees) of $Li_4Ti_5O_{12}$ prepared in Example 1 is 100, an ratio of a main peak (54 degrees) of titania exhibits 0.98. This means that when Li:Ti is 4:5 in terms of a quantitative ratio, $Li_4Ti_5O_{12}$ having high purity, prepared in Example 1, is remarkably improved compared to the resultant prepared in Comparative Example 1 even at a crystalline temperature that is lower than that of Comparative Example 1 by 200° C. or more.

When an Area of a main peak (79 degrees) of $Li_4Ti_5O_{12}$ prepared in Example 2 is 100, a ratio of a main peak (54 degrees) of titania exhibits 1.37. This means that when Li:Ti is 4:5 in terms of a quantitative ratio, $Li_4Ti_5O_{12}$ having high purity, prepared in Example 2, may be prepared at a crystalline temperature that is lower than that of Comparative Example 1 by 200° C. or more by simply increasing a time to capture lithium ions by 0.5 hours.

When an Area of a main peak (79 degrees) of $Li_4Ti_5O_{12}$ prepared in Comparative Example 1 is 100, the ratio of Area of a main peak (54 degrees) of titania exhibits 2.46. This means that a long time and a high crystalline temperature are necessary in order to capture lithium ions.

Preparation of Electrode

EXAMPLE 3

An electrode was prepared by mixing 0.045 g of a material prepared in Example 2 and 0.045 g of graphite (SFG6, available from TimCal) in 0.2 g of a solution of polyvinylidene fluoride (PVDF) (KF1100, available from Gureha Chemistry of Japan) as a binder and 5 wt % of N-methylpyrrolidone (NMP), and then coating the mixture on a copper foil.

COMPARATIVE EXAMPLE 2

An electrode was prepared in the same manner as in Example 3 except that 0.045 g of a material prepared in Comparative Example 1 and 0.045 g of graphite (SFG6, available from TimCal) were mixed.

EXPERIMENTAL EXAMPLE 1

Cycle Properties Test

A coin cell of 2016-form was prepared by using the electrodes prepared in Example 3 and Comparative Example 2 as an anode, and a LI metal as a cathode, and the coin cell was charged and discharged at a voltage between about 1.5 and about 0 V.

A mixed solution of ethylene carbonate (EC), diethylene carbonate (DEC) and fluoro ethylene carbonate (volume ratio: 2/6/2), in which 1.3 M of $LiPF_6$ is dissolved, was used as an electrolyte. Charging was performed on a Li electrode up to 0.001 V by supplying a static current of 100 mA per 1 g of an active material, and then static-voltage charging was performed while a voltage of 0.001 V is being maintained until a measured current reached 10 mA per 1 g of the active material. After a pause period of the coin cell on which charging was completed for about 10 minutes, static-current discharging was performed up to a voltage of 1.5 V by supplying a static current of 100 mA per 1 g of the active material. The result is shown in Table 1.

TABLE 1

|  | Initial Discharging Capacity (mAh/g) | Initial Efficiency (%) | Capacity Maintenance (%) @ 50 cycles |
|---|---|---|---|
| Example 3 | 168 | 99.8 | 99.3 |
| Comparative Example 2 | 165 | 96.5 | 95.8 |

As shown in Table 1, it may bee seen that the initial capacity and initial efficiency of Example 3 are larger than in Comparative Example 2.

As described above, according to the one or more of the above embodiments of the present invention, a problem of a solid phase method using rutile titania as a precursor, in which titania that does not participate in a reaction remains as impurities since lithium ions are decomposed and are not made to a solid solution in a desired composition ratio is addressed, and thus the yield of $Li_4Ti_5O_{12}$ having a small amount of impurities may increase. In addition, $Li_4Ti_5O_{12}$ may be prepared at a low temperature by performing a solid state reaction on brookite-to phase titania as a precursor, thereby reducing driving costs during the preparation of $Li_4Ti_5O_{12}$.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A lithium titanium oxide for an anode active material for a lithium rechargeable battery, wherein the lithium titanium oxide consists of lithium titanate ($Li_2Ti_5O_{12}$) and titania ($TiO_2$); and wherein
    an X-ray diffraction (XRD) spectrum have a first peak of the lithium titanate ($Li_4Ti_5O_{12}$) and a second peak of the titania($TiO_2$), a third peak of the lithium titanate ($Li_4Ti_5O_{12}$), and a fourth peak of the titania($TiO_2$);
    wherein the first peak is in the range of about 78 to about 80 degrees, and the second peak is in the range of about 50 to about 55 degrees, and the third peak is in the range of about 45 to about 50 degrees, and the fourth peak is in the range of about 25 to about 30 degrees:
    wherein $A_{50-55}/A_{78-80}$ is in the range of about 0.5 to about 2.0, where $A_{78-80}$ is an area of the first peak and $A_{50-55}$ is an area of the second peak,
    wherein a peak intensity of the third peak is higher than that of the fourth peak, and
    the lithium titanate has a diameter in the range of about 270 to about 450 nm.

2. The lithium titanium oxide of claim 1, wherein the lithium titanate ($Li_4Ti_5O_{12}$)has a spinel structure.

3. A lithium rechargeable battery comprising the lithium titanium oxide according to claim 1.

4. A lithium rechargeable battery comprising the lithium titanium oxide according to claim 2.

* * * * *